US010095445B2

(12) United States Patent
De et al.

(10) Patent No.: US 10,095,445 B2
(45) Date of Patent: Oct. 9, 2018

(54) SYSTEMS AND METHODS FOR OFFLOADING PROCESSING FROM A HOST TO STORAGE PROCESSING UNITS USING AN INTERCONNECT NETWORK

(71) Applicant: HGST Netherlands B.V., Amsterdam (NL)

(72) Inventors: Arup De, Milpitas, CA (US); Kiran Kumar Gunnam, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 22 days.

(21) Appl. No.: 15/084,333

(22) Filed: Mar. 29, 2016

(65) Prior Publication Data

US 2017/0286170 A1   Oct. 5, 2017

(51) Int. Cl.
*G06F 9/46* (2006.01)
*G06F 3/06* (2006.01)
*G06F 9/50* (2006.01)

(52) U.S. Cl.
CPC ............ *G06F 3/067* (2013.01); *G06F 3/0613* (2013.01); *G06F 3/0647* (2013.01); *G06F 9/5033* (2013.01); *G06F 2209/509* (2013.01)

(58) Field of Classification Search
None
See application file for complete search history.

(56) References Cited

U.S. PATENT DOCUMENTS

| 7,010,579 | B1 * | 3/2006 | Batcher | G06F 9/30032 709/217 |
|---|---|---|---|---|
| 7,447,833 | B2 | 11/2008 | Burroughs et al. | |
| 7,958,280 | B2 | 6/2011 | Salessi et al. | |
| 8,539,201 | B2 * | 9/2013 | McAllister | G06F 17/142 712/22 |
| 8,549,521 | B2 * | 10/2013 | Brokenshire | G06F 9/4843 709/226 |
| 8,792,279 | B2 | 7/2014 | Li et al. | |
| 8,935,463 | B1 | 1/2015 | Aswadhati et al. | |
| 2009/0307691 | A1 * | 12/2009 | Moscibroda | G06F 13/1652 718/100 |

(Continued)

FOREIGN PATENT DOCUMENTS

CN   103150427 A   6/2013

OTHER PUBLICATIONS

Hewlett-Packard Development Company, L.P. "Optimized solid-state drive performance with HP SSD Smart Path", downloaded from http://h20195.www2.hp.com/v2/getpdf.aspx/4AA4-8144ENW.pdf?ver=2.0; 9 pages.

*Primary Examiner* — Gregory A Kessler
(74) *Attorney, Agent, or Firm* — Loza & Loza, LLP; Gabriel Fitch

(57) ABSTRACT

Systems and methods for offloading processing from a host to one or more storage processing units using an interconnect network are provided. One such system includes a host having a processing task, a plurality of storage processing units (SPUs), a host interface configured to enable communications between the host and each of the plurality of SPUs, and an interconnection network coupled to at least two of the plurality of SPUs, where the host is configured to command at least one of the plurality of SPUs to perform the processing task, and command the interconnection network to couple two or more of the plurality of SPUs.

17 Claims, 6 Drawing Sheets

(56) References Cited

U.S. PATENT DOCUMENTS

2014/0129753 A1  5/2014  Schuette et al.
2014/0289462 A9  9/2014  Malwankar
2014/0337540 A1  11/2014 Johnson et al.

* cited by examiner

SYSTEMS AND METHODS FOR OFFLOADING PROCESSING FROM A HOST TO STORAGE PROCESSING UNITS USING AN INTERCONNECT NETWORK

FIELD

Aspects of the disclosure relate generally to solid state drives, and more specifically, to systems and methods for offloading processing from a host to one or more storage processing units using an interconnect network.

BACKGROUND

In a variety of consumer electronics, solid state drives (SSDs) incorporating non-volatile memories (NVMs) are frequently replacing or supplementing conventional rotating hard disk drives for mass storage. These SSDs are often grouped together in storage arrays. In a traditional compute and storage model for SSD storage arrays, the host handles the computation tasks and storage arrays handle the storage tasks. It may be possible to offload input/output and data intensive application tasks to the storage array or to a cluster of SSDs. In several applications, there is still a significant need for communication between the storage processing units (SPUs) that make up the storage array. This communication can be achieved either through host or peer to peer communication using the host interface bus, which is often implemented using a Peripheral Component Interconnect Express (PCIe) bus. However either of these approaches quickly leads to saturation of the host and/or the host interface bus as undesirably low bus speeds become a bottleneck for such communications.

SUMMARY

In one aspect, this disclosure relates to a system for offloading processing from a host to one or more storage processing units each including a non-volatile memory (NVM), the system including a host having a processing task, a plurality of storage processing units (SPUs), a host interface configured to enable communications between the host and each of the plurality of SPUs, and an interconnection network coupled to at least two of the plurality of SPUs, where the host is configured to command at least one of the plurality of SPUs to perform the processing task, and command the interconnection network to couple two or more of the plurality of SPUs.

In another aspect, this disclosure relates to a method for offloading processing from a host to one or more storage processing units each including a non-volatile memory (NVM), the method including sending a processing task from the host to a first storage processing unit (SPU) of a plurality of SPUs via a host interface, commanding the first SPU to perform the processing task, and commanding an interconnection network to couple two or more of the plurality of SPUs, where the interconnection network is configured to enable direct data transfer between SPUs connected thereto.

In another aspect, this disclosure involves a method for offloading processing from a host to one or more storage processing units each including a non-volatile memory (NVM), the method including receiving a processing task from the host at a first storage processing unit (SPU) of a plurality of SPUs via a host interface, performing, at the first SPU, the processing task, and transferring data from the first SPU to a second SPU via an interconnection network.

In yet another aspect, this disclosure involves A method for offloading processing from a host to one or more storage processing units each including a non-volatile memory (NVM), the method including receiving a processing task from the host at a second storage processing unit (SPU) of a plurality of SPUs via a host interface, performing, at the second SPU, the processing task, and receiving data, at the second SPU, from a first SPU via an interconnection network.

DETAILED DESCRIPTION

Figure 1:
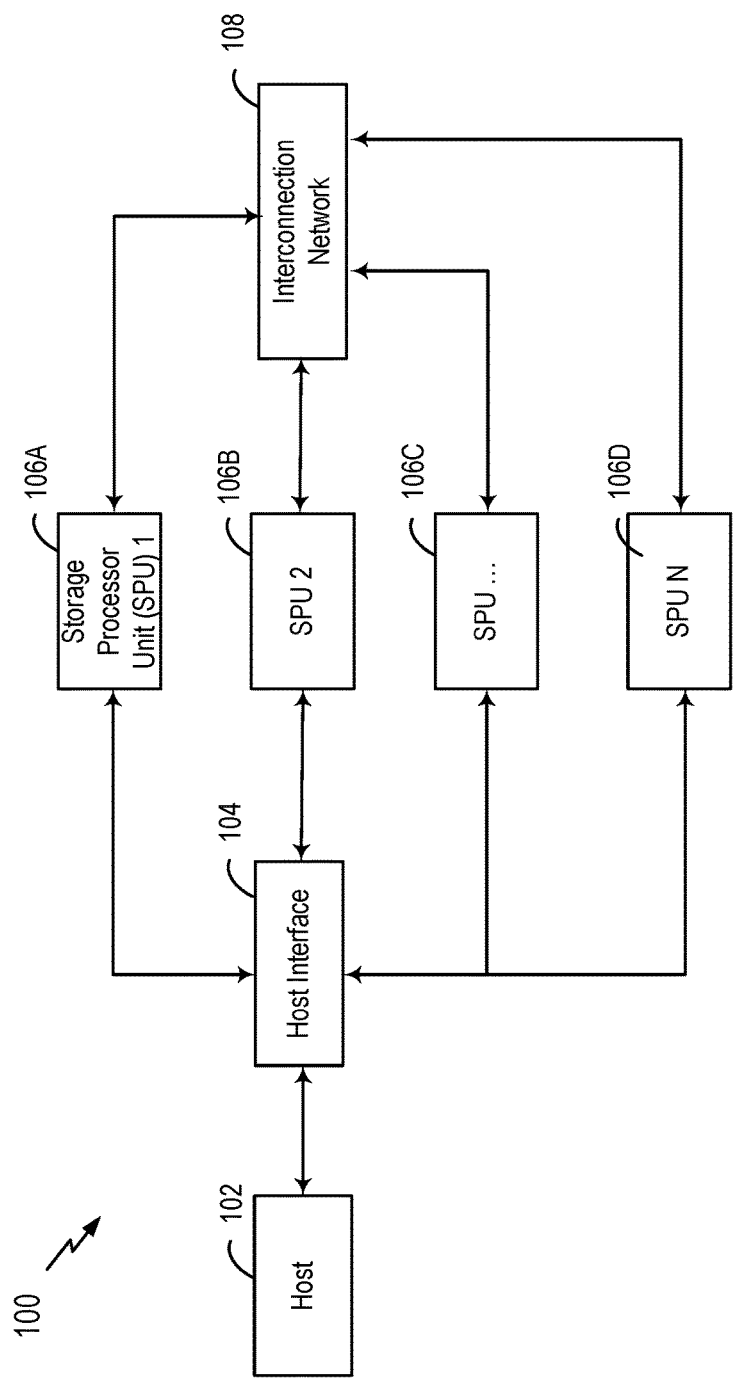
FIG. 1 is a block diagram of a storage system including a solid state device (SSD) array with multiple storage processing units (SPUs) and an interconnection network for enabling direct data transfers between SPUs in accordance with one embodiment of the disclosure.

Referring now to the drawings, systems and methods for offloading processing from a host to one or more storage processing units (SPUs) using an interconnect network configured to enable direct data transfers between the SPUs are illustrated. In one embodiment of such a system, this disclosure involves a system for offloading processing from a host to one or more storage processing units each including a non-volatile memory (NVM), where the system includes a host having a processing task, a plurality of storage processing units (SPUs), a host interface configured to enable communications between the host and each of the plurality of SPUs, and an interconnection network coupled to at least two of the plurality of SPUs. In such case, the host is configured to command at least one of the plurality of SPUs to perform the processing task, and command the interconnection network to couple two or more of the plurality of SPUs.

In one aspect of the method, this disclosure involves a method for offloading processing from a host to one or more storage processing units each including a non-volatile memory (NVM), the method including sending a processing task from the host to a first storage processing unit (SPU) of a plurality of SPUs via a host interface, commanding the first SPU to perform the processing task, and commanding an interconnection network to couple two or more of the plurality of SPUs, where the interconnection network is configured to enable direct data transfer between SPUs connected thereto. In another aspect of the method, this disclosure involves a method for offloading processing from a host to one or more storage processing units each including a non-volatile memory (NVM), the method including receiving a processing task from the host at a first storage processing unit (SPU) of a plurality of SPUs via a host interface, performing, at the first SPU, the processing task, and transferring data from the first SPU to a second SPU via an interconnection network.

FIG. 1 is a block diagram of a storage system 100 including a solid state device (SSD) array with multiple storage processing units (SPUs) (106A, 106B, 106C, 106D) and an interconnection network 108 for enabling direct data transfers between SPUs in accordance with one embodiment of the disclosure. The storage system 100 further includes a host 102 that is configured to send data to each of the SPUs (106A-106D) via a host interface 104. The data can be stored at the SPUs (106A-106D). As will be described in greater detail below, the host 102 may also offload preselected processing tasks to one or more of the SPUs to decrease its workload and/or for other purposes related to efficiency of the system. The host 102 may include a host central processing unit (CPU) or other suitable processing circuitry, a host dynamic random access memory (DRAM), and/or low level software or firmware such as a device driver. In one aspect, the host 102 may include an application programming interface (API) to offload the processing tasks (e.g., computations) to the SPUs. In one aspect, the host 102 may be configured to control the connections made in the interconnection network 108. In one aspect, the host 102 is configured to command at least one of the SPUs 106A-106D to perform one or more processing tasks. In one aspect, the host 102 is configured to command the interconnection network 108 to couple two or more of the SPUs 106A-106D.

The host interface 104 can be implemented using any number of suitable bus interfaces, including, for example, a Peripheral Component Interconnect Express (PCIe) bus interface, a serial AT attachment (SATA) bus interface, a serial attached small computer system interface (SASCSI or just SAS), or another suitable hard drive bus interface known in the art. As described above, the host interface 104 may become saturated as the host 102 and/or SPUs 106A-106D bog down the bus with a high volume of communication.

The storage processing units 106A-106D may include a non-volatile memory (NVM) storage unit and one or more computing accelerators. In such case, the NVM can be configured to store data while the computing accelerators can be configured to perform various processing tasks (e.g., perform local processing). In several embodiments, the NVM may include flash memory. Flash memory stores information in an array of floating gate transistors, called "cells", and can be electrically erased and reprogrammed in blocks. In some embodiments, the NVM may include storage class memory such as resistive random access memory (RRAM or ReRAM), phase change memory (PCM), magneto-resistive random access memory (MRAM) such as spin transfer torque (STT) MRAM, three dimensional cross point (3D XPoint) memory, and/or other suitable non-volatile memory. The 3D XPoint memory can be a non-volatile memory technology in which bit storage is based on a change of bulk resistance, in conjunction with a stackable cross-gridded data access array.

The interconnection network 108 can be an N by N interconnection network where there are N SPUs coupled thereto. In several embodiments, the interconnection network 108 can be configured as a non-blocking network or a blocking network depending on design requirements. In several embodiments, the type of interconnection network 108 used can be based on the type of work loads that are expected for SPU communications. Based on the network used and the connectivity needed, the intercommunication between any of the N by N SPUs can be achieved in one or more cycles.

In one embodiment, for example, the interconnection network 108 is configured as a non-blocking network and may be implemented using a Benes network. A Benes network typically has $2 \log_2 N - 1$ stages, each containing N/2 2×2 crossbar switches, and uses a total of $N \log_2 N - N/2$ 2×2 crossbar switches. If a Benes network is used, some non-trivial programming of the switches may be performed either by a local processor or a remote processor such as the host or one of the SPUs.

In one aspect, an N×N Benes network may consist of an N×N butterfly network followed by an inverse butterfly network. In such case, the Benes network may contain $2 \log_2 N$ stages of switching elements. However the last stage of the butterfly network can be merged with the first stage of the inverse butterfly to decrease the total number of stages to $2 \log_2 N - 1$ as is discussed above. Note that the recursive structure of the butterfly and inverse butterfly networks automatically leads to a recursive decomposition of the Benes network. In one aspect, an N×N Benes network can be viewed as consisting of two outer stages of switching elements connected to top and bottom N/2×N/2 Benes sub-networks. This conceptualization can be very useful in deriving the looping algorithm for routing permutations in the network.

An 8×8 Benes network may be useful for applying an example of the looping algorithm (e.g., programming of the Benes network needed to complete a preselected routing therethrough). The example Benes network may include an outer left stage with 8 ports (e.g., inputs) and an outer right stage (e.g., outputs) with two 4×4 Benes sub-networks connected therebetween. The looping algorithm may begin by setting a switching element in the outer left stage such that companion inputs are directed to top and bottom sub-networks. The destination switching elements in the outer right stage can be automatically be set to receive these inputs from the correct sub-networks. By alternately setting switches in the outer stages, the entire permutation can be divided into two smaller permutations to be realized at each Benes sub-network. The looping algorithm sequentially examines the inputs in each stage and hence the control complexity of the Benes is O(N log N). The parallel version of the looping algorithm can have a complexity of $O(\log^2 N)$ using O(N) processors.

In one embodiment, the interconnection network 108 is configured as a blocking network and may be implemented using an Omega network. It may be possible to use the Omega network for full connectivity between SPUs. However, the Omega network may also be blocking in some cases so that simultaneous connection of the N SPUs is not possible in some configurations. In such case, the blocked connections can be routed through peer to peer connection via the host interface (e.g., PCIe bus). The Omega network is a network that receives z inputs and has multiple inter-connected stages of switches. Each switch, which receives two inputs and presents two outputs (e.g., like a standard two-port network), can be set based on a bit value to (i) pass the two inputs directly to the two outputs in the order they were received (e.g., top input is provided to top output and bottom input is provided to bottom output) or (ii) swap the two inputs (e.g., such that the top input is provided to the bottom output, and vice versa). The outputs of each stage are connected to the inputs of each subsequent stage using a perfect shuffle connection system. In other words, the connections at each stage are equivalent to dividing z inputs into two equal sets of z/2 inputs and then shuffling the two sets together, with each input from one set alternating with the corresponding input from the other set. For z inputs, an Omega network is capable of performing $2^z$ different permutations, and each permutation coefficient (e.g., $P_{j,k}$) is represented by $(z/2) \log_2(z)$ bits, where each bit corresponds to one switch.

As compared to the Omega network, the Benes network is likely to be at least twice as expensive, and the routing of the Benes network, as described above, may need a dedicated processing engine with high computing power. In other embodiments, the interconnection network can be implemented as a butterfly network, a crossbar switch network, or another suitable network.

In the context described above, the host CPU or SPU computing accelerators can refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information.

In several embodiments, one of the SPUs (e.g., SPU1 or 106A) is configured to communicate with a second SPU (e.g., SPU2 or 106B) using the interconnection network 108 instead of the host interface 104. In several embodiments, one or more of the SPUs is configured to send data to any of the other SPUs using the interconnection network 108. In several aspects, and as depicted in FIG. 1, the interconnection network 108 can be coupled to all of the SPUs. In one aspect, the interconnection network 108 is configured to enable direct data transfer between two or more of the SPUs connected thereto. In several embodiments, the host interface 104 and the interconnection network 108 are distinct networks.

Figure 2:
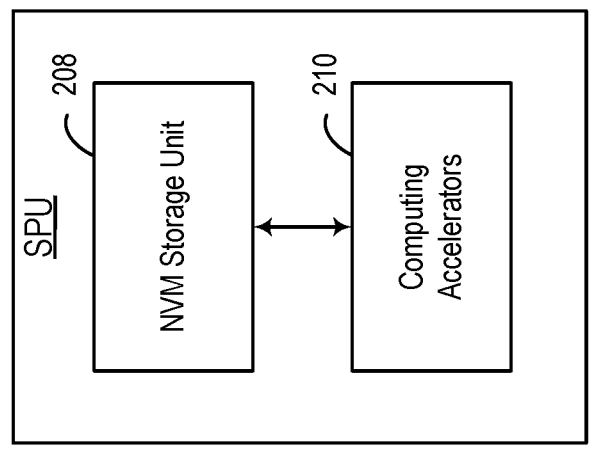
FIG. 2 is a block diagram of a storage processing unit (SPU) including a non-volatile memory storage unit and one or more computing accelerators in accordance with one embodiment of the disclosure.

FIG. 2 is a block diagram of a storage processing unit (SPU) 206 including a non-volatile memory (NVM) storage unit 208 and one or more computing accelerators 210 in accordance with one embodiment of the disclosure. The NVM 208 may include flash memory or other suitable non-volatile memory. Flash memory stores information in an array of floating gate transistors, called "cells", and can be electrically erased and reprogrammed in blocks. The computing accelerators may include one or more processing circuits configured to perform tasks assigned by a host. Other aspects of NVMs and computing accelerators are not described here but are well known in the art.

In several embodiments, the SPU 206 further includes first communication circuitry (e.g., input/output circuitry) for communicating on an interconnection network. This first communication circuitry can include one or more ports configured for communicating single or multiple bits of information (e.g., communication could be serial or parallel). In several embodiments, the SPU 206 further includes second communication circuitry (e.g., input/output circuitry such as is configured for PCIe) for communicating on an host interface network.

Figure 3:
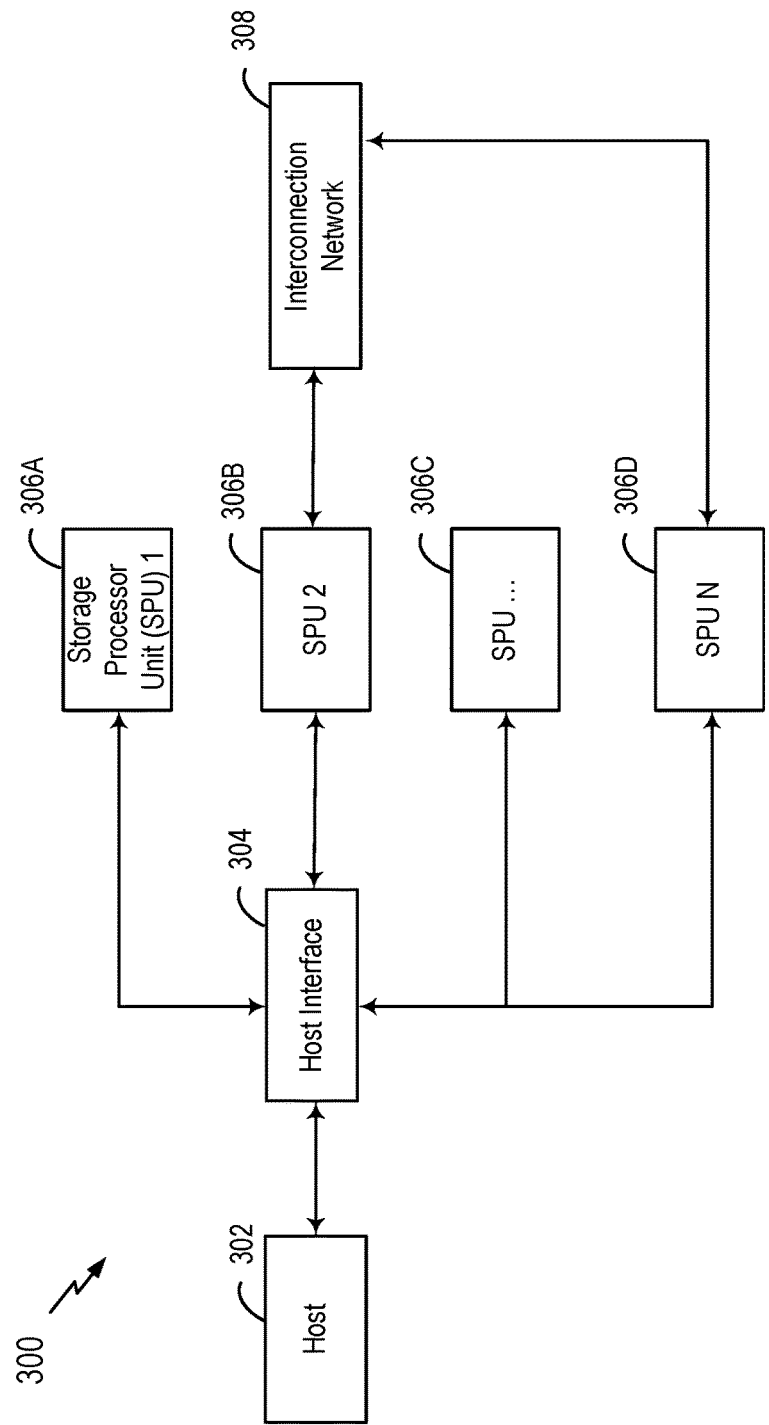
FIG. 3 is a block diagram of a storage system including a solid state device (SSD) array with multiple storage processing units (SPUs) and a partial interconnection network for enabling direct data transfers between preselected SPUs in accordance with one embodiment of the disclosure.

FIG. 3 is a block diagram of a storage system 300 including a solid state device (SSD) array with multiple storage processing units (SPUs) (306A, 306B, 306C, 306D) and a partial interconnection network 308 for enabling direct data transfers between preselected SPUs in accordance with one embodiment of the disclosure. The storage system 300 can include substantially the same components and connections as those described above for storage system 100 of FIG. 1. In the embodiment of FIG. 3, however, the interconnection network 308 may not be connected to all of the SPUs. In FIG. 3, for example, the interconnection network 308 is only coupled to SPU 2 (306B) and SPU N (306D). In such case, the interconnection network 308 may only be configured to enable direct data transfers between these two SPUs (306B, 306D). The other SPUs (306A, 306C) may use the host interface 304 and/or host 302 to transfer data between SPUs. While SPU 2 (306B) and SPU N (306D) are coupled by interconnection network 308 to enable direct data transfers there between, these two SPUs may also communicate through peer to peer communication on the host interface 304 with each other and other SPUs.

Figure 4:
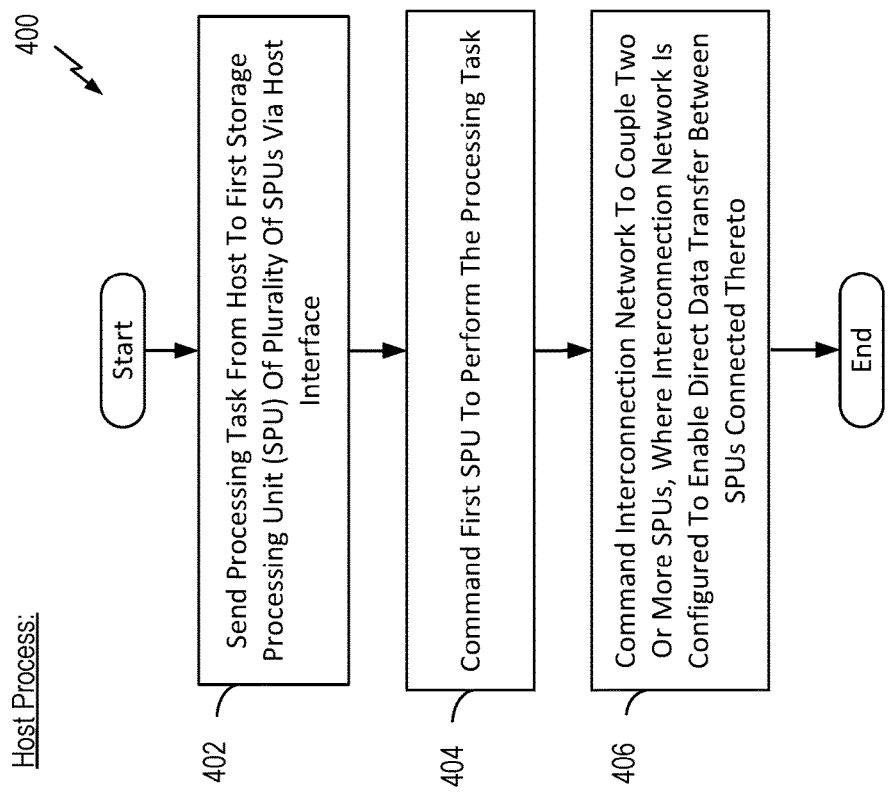
FIG. 4 is a flow chart of a host process for offloading processing tasks to SPUs coupled by an interconnection network for enabling direct data transfers between SPUs in accordance with one embodiment of the disclosure.

FIG. 4 is a flow chart of a host process 400 for offloading processing tasks to SPUs coupled by an interconnection network for enabling direct data transfers between SPUs in accordance with one embodiment of the disclosure. In particular embodiments, this process can be performed by the host 102 of FIG. 1 or the host 302 of FIG. 3. In block 402, the process sends a processing task from the host to a first storage processing unit (SPU) of a plurality of SPUs via a host interface. In some embodiments, this may include sending multiple processing tasks to the first SPU and/or sending multiple processing tasks to the first SPU and other SPUs. In one aspect, the first SPU, or any of the other SPUs described herein, may be used as a key-value store or key-value database. In such case, the processing task may include performing a key look up, a key update operation, or another task associated with a key-value store. In another aspect, the processing task may include performing matrix operations, data manipulation, and/or data analytics on data stored in the first SPU, or any of the SPUs described herein. In block 404, the process commands the first SPU to perform the processing task. In some embodiments, the command is included in the same communication that sent the processing task in block 402. In block 406, the process commands an interconnection network to couple two or more of the plurality of SPUs, where the interconnection network is configured to enable direct data transfer between SPUs connected thereto. In one embodiment, the interconnection network may be any of the various interconnection networks as described herein, including, for example, interconnection network 108 of FIG. 1 or interconnection network 308 of FIG. 3.

In one aspect, the process can perform the sequence of actions in a different order. In another aspect, the process can skip one or more of the actions. In other aspects, one or more of the actions are performed simultaneously. In some aspects, additional actions can be performed.

Figure 5:
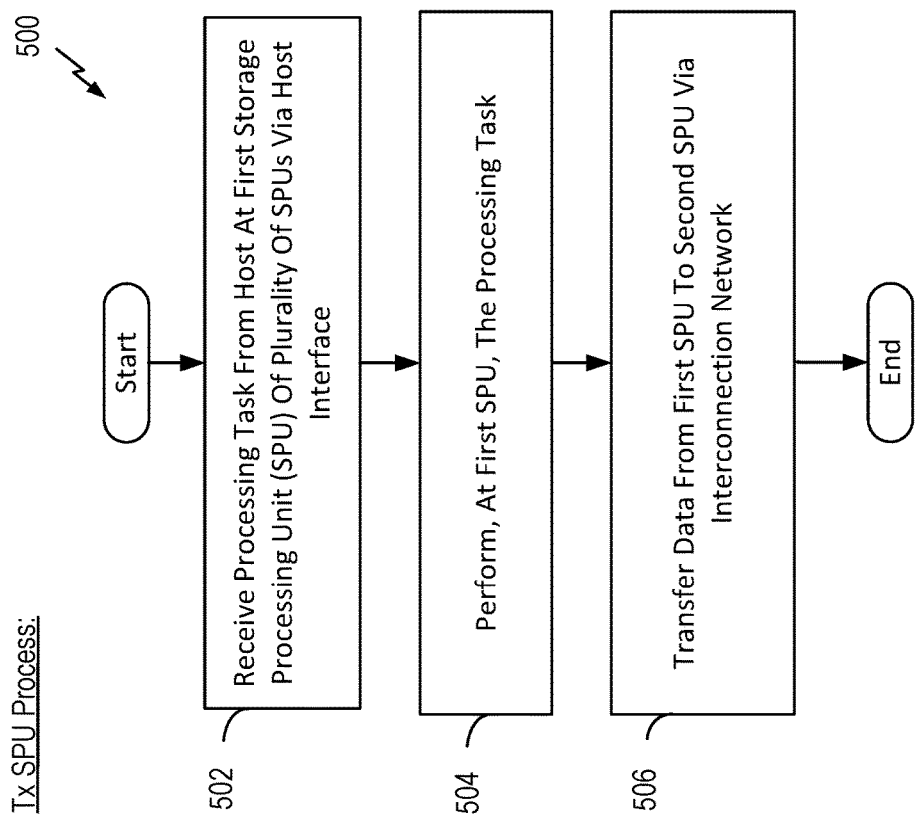
FIG. 5 is a flow chart of a SPU process for performing local processing tasks and transmitting information to another SPU using an interconnection network for enabling direct data transfers between SPUs in accordance with one embodiment of the disclosure.

FIG. 5 is a flow chart of a SPU process 500 (Tx SPU Process) for performing local processing tasks and transmitting information to another SPU using an interconnection network for enabling direct data transfers between SPUs in accordance with one embodiment of the disclosure. In particular embodiments, this process 500 can be performed by any or all of the SPUs (106A-106D) of FIG. 1 or any of the SPUs (306A-306D) of FIG. 3. In block 502, the process receives a processing task from the host at a first storage processing unit (SPU) of a plurality of SPUs via a host interface. In one aspect, the processing task may include multiple processing tasks. In block 504, the process performs, at the first SPU, the processing task. In one aspect, the processing task may include one or more computations and the storage of the data in the NVM storage unit. In block 506, the process transfers data from the first SPU to a second SPU via an interconnection network. The interconnection network can be configured to enable direct data transfer between SPUs connected thereto. In one embodiment, the interconnection network may be any of the various interconnection networks as described herein, including, for example, interconnection network 108 of FIG. 1 or interconnection network 308 of FIG. 3.

In one aspect, the SPU may also be configured to communicate with other SPUs using a host interface that is distinct from the interconnection network. In such case, the SPU may prioritize communications on the interconnection network to minimize communications on the host interface (e.g., avoid a bottleneck on the host interface).

In one aspect, the process can perform the sequence of actions in a different order. In another aspect, the process can skip one or more of the actions. In other aspects, one or more of the actions are performed simultaneously. In some aspects, additional actions can be performed.

Figure 6:
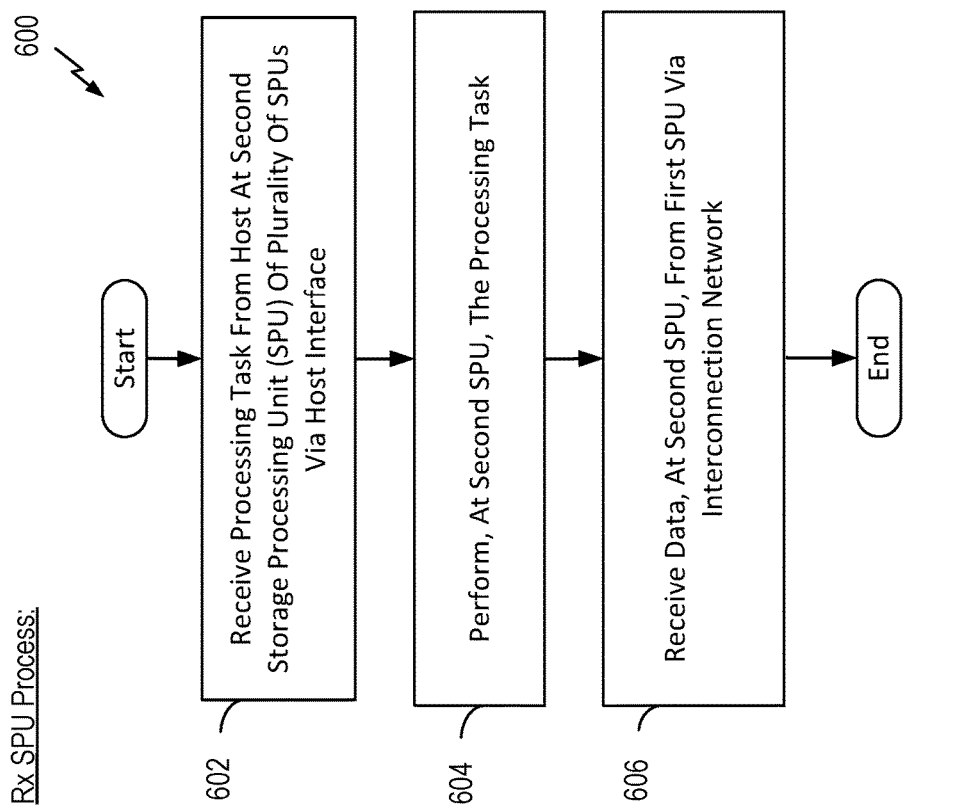
FIG. 6 is a flow chart of a SPU process for performing local processing tasks and receiving information from another SPU using an interconnection network for enabling direct data transfers between SPUs in accordance with one embodiment of the disclosure.

FIG. 6 is a flow chart of a SPU process 600 (Rx SPU Process) for performing local processing tasks and receiving information from another SPU using an interconnection network for enabling direct data transfers between SPUs in accordance with one embodiment of the disclosure. In particular embodiments, this process 600 can be performed by any or all of the SPUs (106A-106D) of FIG. 1 or any of the SPUs (306A-306D) of FIG. 3. In block 602, the process receives a processing task from the host at a second storage processing unit (SPU) of a plurality of SPUs via a host interface. In one aspect, the processing task may include multiple processing tasks. In block 604, the process performs, at the second SPU, the processing task. In one aspect, the processing task may include one or more computations and the storage of the data in the NVM storage unit. In block 606, the process receives data, at the second SPU, from the first SPU via an interconnection network. The interconnection network can be configured to enable direct data transfer between SPUs connected thereto. In one embodiment, the interconnection network may be any of the various interconnection networks as described herein, including, for example, interconnection network 108 of FIG. 1 or interconnection network 308 of FIG. 3.

In one aspect, the process also stores, at the second SPU, the data generated at the second SPU and the data received from the first SPU. In such case, the second SPU may be acting in accordance with the instructions of the host received with the processing task.

In one aspect, any of the SPUs may request that some of its assigned tasks be performed at any of the other SPUs. In several embodiments, a general preference for operation may include that data is transferred through interconnect network, while commands are transferred through the host interface, and generally from the host. In one aspect, a SPU may transfer data to another SPU through the host via the host interface. In one aspect, the host (or one of the SPUs) may send one or more commands through the interconnection network by adding special headers so that the SPU can differentiate between the data packets and command packets.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A system for offloading processing from a host to one or more storage processing units each comprising a non-volatile memory (NVM), the system comprising:
a host having a processing task;
a plurality of storage processing units (SPUs);
a host interface configured to enable communications between the host and each of the plurality of SPUs; and
an interconnection network coupled to at least three of the plurality of SPUs;
wherein the host is configured to:
command at least one of the plurality of SPUs to perform the processing task; and
command the interconnection network to couple three or more of the plurality of SPUs, wherein the interconnection network enables any one of the coupled three or more of the plurality of SPUs to communicate with any other one of the coupled three or more of the plurality of SPUs, and wherein each of the plurality of SPUs comprises an NVM and a processing circuitry configured to perform the processing task.

2. The system of claim 1, wherein each of the plurality of SPUs is configured to perform local processing.

3. The system of claim 1, wherein a first SPU of the coupled two or more of the plurality of SPUs is configured to communicate with a second SPU of the coupled two or more of the plurality of SPUs using the interconnection network.

4. The system of claim 3, wherein the first SPU is configured to communicate with the second SPU using the interconnection network instead of the host interface.

5. The system of claim 3, wherein the first SPU is configured to send data to the second SPU using the interconnection network.

6. The system of claim 1, wherein the interconnection network is coupled to all of the plurality of SPUs.

7. The system of claim 1, wherein the interconnection network is configured to enable direct data transfer between SPUs connected thereto.

8. The system of claim 1, wherein the host interface and the interconnection network are distinct networks.

9. The system of claim 1, wherein the host interface comprises a Peripheral Component Interconnect Express (PCIe) network.

10. The system of claim 1, wherein the interconnection network comprises at least one of an Omega network, a Butterfly network, a crossbar switch network, or a Benes network.

11. The system of claim 1, wherein the NVM includes a flash memory.

12. A method for offloading processing from a host to one or more storage processing units each comprising a non-volatile memory (NVM), the method comprising:

sending a processing task from the host to a first storage processing unit (SPU) of a plurality of SPUs via a host interface;

commanding the first SPU to perform the processing task; and commanding an interconnection network to couple three or more of the plurality of SPUs, wherein the interconnection network enables any one of the coupled three or more of the plurality of SPUs to transfer data directly to any other one of the coupled three or more of the plurality of SPUs, and wherein each of the plurality of SPUs comprises an NVM and a processing circuitry configured to perform the processing task.

13. The method of claim 12, wherein the first SPU is configured to perform local processing.

14. The method of claim 12, wherein the first SPU is configured to communicate with a second SPU of the coupled two or more of the plurality of SPUs using the interconnection network.

15. The method of claim 14, wherein the first SPU is configured to communicate with the second SPU using the interconnection network instead of the host interface.

16. The method of claim 12, wherein the interconnection network is coupled to all of the plurality of SPUs.

17. The method of claim 12, wherein the interconnection network comprises at least one of an Omega network, a Butterfly network, a crossbar switch network, or a Benes network.

\* \* \* \* \*